Jan. 30, 1951 L. F. MAYLE 2,539,454
PICTURE SIGNAL MIXER CIRCUIT
Filed Oct. 2, 1947
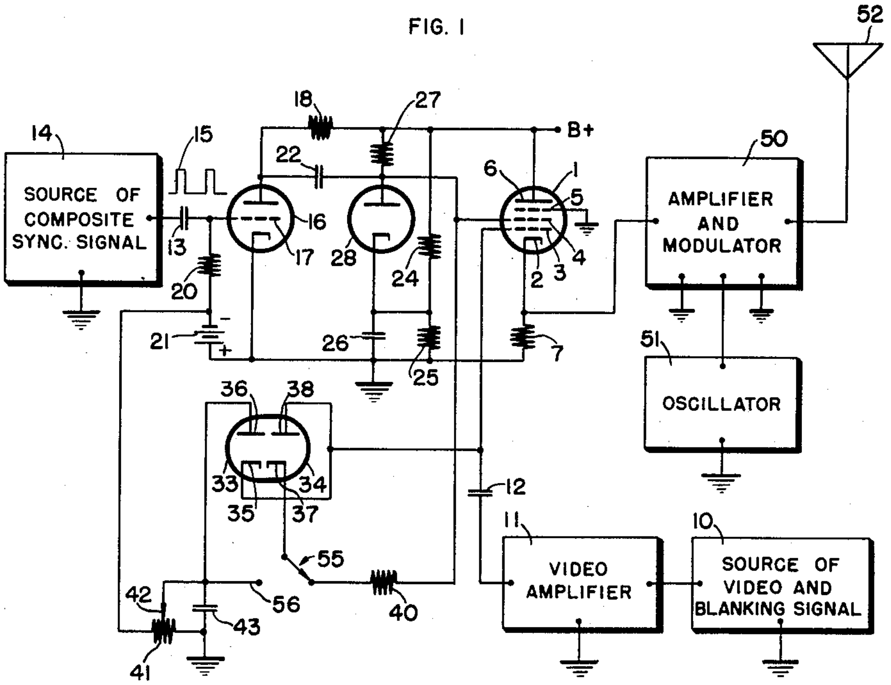
FIG. I
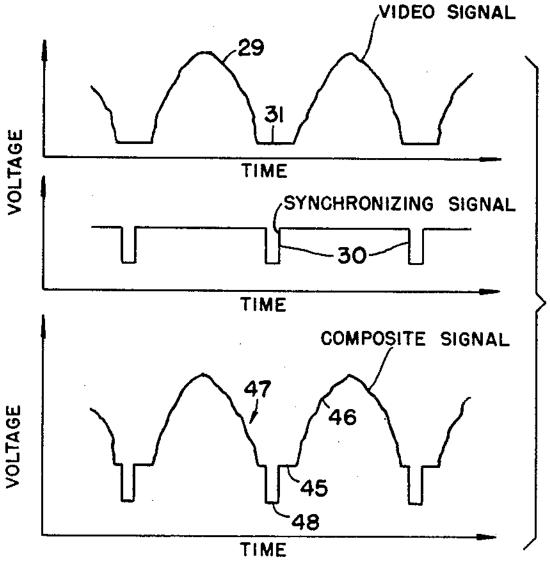
FIG. 2
INVENTOR.
LOUIS F. MAYLE
BY Arthur A. Smith
ATTORNEY Patented Jan. 30, 1951 2,539,454

UNITED STATES PATENT OFFICE 2,539,454

PICTURE SIGNAL MIXER CIRCUIT

Louis F. Mayle, Fort Wayne, Ind., assignor to Farnsworth Television & Radio Corporation, a corporation of Delaware Application October 2, 1947, Serial No. 777,383

4 Claims. (Cl. 178—7.1)

This invention relates generally to signal mixer circuits, and particularly relates to a circuit for mixing a video signal with a synchronizing signal to derive a composite picture output signal and for keeping the amplitude of the synchronizing output signal at a predetermined value with respect to that of the video output signal.

It is conventional television practice to transmit a composite picture signal comprising the video and blanking signal and the horizontal and vertical synchronizing signal. Since the video signal and the synchronizing signal are developed by separate sources, they must be mixed to derive the desired composite picture signal. Conventionally, the video signal is mixed with the synchronizing signal by impressing each signal on a separate amplifier tube, the two tubes having a common output impedance element. However, the amplitude of the synchronizing signal cannot be controlled or adjusted in such a conventional mixer circuit. In accordance with the practice recommended by the Radio Manufacturers' Association, the pedestal level corresponding to the blanking pulses of the carrier wave shall be set at (75±1) per cent of the peak amplitude of the carrier wave. Accordingly, the tolerance for the amplitude of the synchronizing signal which extends from 75 per cent to 100 per cent of the carrier wave is ±4 per cent. The video signal, on the other hand, occupies the region from 15 per cent or less to 75 per cent of the peak amplitude of the carrier wave. It is accordingly of great importance to keep the amplitude of the synchronizing pulses constant with respect to that of the video signal to comply with the recommended television standards.

It is an object of the present invention, therefore, to provide a novel circuit for mixing the video and blanking signal with the composite synchronizing signal in a single tube.

A further object of the invention is to provide a composite picture signal mixer circuit having means for keeping the amplitude of the synchronizing output pulses at a predetermined value with respect to that of the video output signal.

Another object of the invention is to provide a mixer circuit of the type referred to having means for adjusting the level of the blanking pulses, that is, the pedestal level to keep the amplitude of the synchronizing pulses at a value corresponding to the recommended television standards.

In accordance with the present invention there is provided a composite picture signal mixer circuit comprising a source of synchronizing signal pulses and a source of a video signal. A mixer tube is provided which has input and output electrodes. There are provided means for normally rendering the tube operative and means coupled to the mixer tube and responsive to the synchronizing signal for cutting off the tube upon the arrival of each of the synchronizing pulses. There are further provided means for impressing the video signal between the input electrodes and means coupled to the input electrodes and responsive to the synchronizing signal for periodically bringing the input electrodes to a predetermined voltage upon the arrival of each of the synchronizing pulses. Finally, impedance means are provided which are coupled to the output electrodes for deriving a composite picture output signal including the video and the synchronizing signal. Thus the synchronizing output signal is kept at a predetermined amplitude with respect to the video output signal.

For a better understanding of the invention, together with other and further objects thereof, reference is made to the following description, taken in connection with the accompanying drawing, and its scope will be pointed out in the appended claims.

In the accompanying drawing, Fig. 1 is a circuit diagram of a signal mixer circuit embodying the present invention, while Fig. 2 is a graph illustrating the video input signal, the synchronizing input signal and the composite picture output signal which are developed at different points of the mixer circuit of Fig. 1.

Referring now to Fig. 1, there is illustrated a circuit arranged for mixing the video and blanking signal with the composite synchronizing signal, that is, the horizontal and vertical synchronizing signal. The mixer circuit includes mixer tube 1 which may be a screen grid tetrode, or a pentode as illustrated. Mixer tube 1 comprises cathode 2, control grid 3, screen grid 4, suppressor grid 5 and anode 6. Anode 6 is connected to a suitable positive voltage supply indicated at B+, while cathode 2 is connected to ground through cathode resistor 7. Mixer tube 1 accordingly is arranged as a cathode follower, and the output signal may be derived across cathode resistor 7 although it will be understood that the output signal may also be developed across a suitable anode resistor. Suppressor grid 5 may be connected to ground as shown.

In accordance with the present invention the video and blanking signal is impressed upon control grid 3. Source 10 develops the video and blanking signal which is amplified by video amplifier 11, the output of which is coupled to control grid 3 of mixer tube 1 through coupling condenser 12. The video signal developed by amplifier 11 is shown at 29 in Fig. 2 and extends in a positive polarity with respect to blanking pulses 31. The composite synchronizing signal, that is, the horizontal and vertical synchronizing signal is developed by source 14 in a positive polarity as indicated at 15. Synchronizing signal 15 is impressed through coupling condenser 13 upon the control grid 17 of amplifier 16 which is provided for reversing the signal polarity. The anode of amplifier 16 is connected to the positive voltage source B+ through anode resistor 18, while its cathode is grounded as shown. For the purpose of rendering amplifier 16 normally inoperative, its control grid 17 is connected to ground through grid leak resistor 21 and a suitable source of negative potential, such as battery 21 having its positive terminal grounded. Upon the arrival of a positive synchronizing pulse 15, amplifier 16 will become conductive, and the voltage drop developed across anode resistor 18 will be impressed through coupling condenser 22 upon screen grid 4 of mixer tube 1.

Mixer tube 1 is arranged to be normally in operative condition. To this end a suitable positive potential is normally impressed upon its screen grid 4. This is effected by two voltage dividers, one of which includes resistors 24 and 25 connected in series between the positive voltage source B+ and ground. The junction point between resistors 24 and 25 is by-passed to ground by condenser 26. Another voltage divider comprises the series connection of resistor 27 and diode 28 connected between positive voltage source B+ and the junction point of resistors 24 and 25. The junction point between resistor 27 and diode 28 is connected to screen grid 4.

Diode 28 functions as a ceiling tube and is normally conducting. The potential impressed on screen grid 4 of mixer tube 1 is accordingly substantially that of the junction point of resistors 24 and 25, if the voltage drop across diode 28 is disregarded. However, as soon as amplifier 16 is rendered conducting by a positive synchronizing pulse 15, a negative synchronizing pulse such as indicated at 30 in Fig. 2 is impressed upon screen grid 4 through coupling condenser 22. Diode 28 is accordingly rendered nonconducting, and the negative potential impressed on screen grid 4 will render mixer tube 1 inoperative substantially for the duration of a synchronizing pulse.

In accordance with the present invention a clamping circuit is furthermore connected to control grid 3 of mixer tube 1. The clamping circuit has the function of keeping the level of the blanking input pulses indicated at 31 in Fig. 2 at a predetermined value whereby the amplitude of the synchronizing output pulses is determined as will be more fully explained hereinafter. The clamping circuit includes two diodes 33 and 34 which may have a common envelope as illustrated. Diode 33 is provided with cathode 35 and anode 36 while diode 34 has cathode 37 and anode 38. Cathode 35 of diode 33 is tied to anode 38 of diode 34 and both are connected to control grid 3 of mixer tube 1. The negative synchronizing pulses 30 developed by amplifier 16 are impressed on cathode 37 of diode 34 through coupling condenser 22 and resistor 40. A negative potential of predetermined magnitude is impressed on anode 36 of diode 33. To this end the negative terminal of battery 21 is connected to ground through resistor 41, and anode 36 is connected to resistor 41 through variable tap 42 which is by-passed to ground by condenser 43.

The mixer circuit of the invention operates as follows. The video input signal 29 which is developed by video amplifier 11 is impressed upon control grid 3 of mixer tube 1. In the absence of a synchronizing signal, mixer tube 1 is in operative condition in view of the positive potential impressed on its screen grid 4 through the voltage divider including resistor 27, diode 28 and resistor 25. Let it now be assumed that a positive synchronizing pulse 15 developed by source 14 is impressed upon amplifier 16 whereupon a negative synchronizing pulse 30 is developed across anode resistor 18. Accordingly, condenser 22 is driven negative to impress a negative potential upon screen grid 4 of mixer tube 1. Mixer tube 1 is thus rendered inoperative until diode 28 becomes again conducting.

At the same time the negative synchronizing pulse 30 is impressed through condenser 22 and resistor 40 upon cathode 37 of diode 34. Assuming that cathode 37 of diode 34 is now driven negative with respect to anode 36 of diode 33, diodes 34 and 33 will become conducting, and coupling condenser 12 which is connected to control grid 3 of mixer 1 will be driven to a predetermined negative potential which is determined by adjustable tap 42. At the same time the negative potential which has previously been impressed on coupling condenser 22 connected to screen grid 4 of mixer tube 1 will be partly dissipated through diodes 34 and 33.

Upon the arrival of the trailing edge of synchronizing pulse 30, a positive potential will be impressed on coupling condenser 22 whereupon diode 28 again becomes conducting. Consequently, a positive potential is again impressed upon screen grid 4 of mixer tube 1 which will render the mixer tube operative. Simultaneously, the clamping circuit is rendered inoperative. At that instant control grid 3 of mixer tube 1 is still held or clamped at the predetermined negative potential impressed thereon through coupling condenser 12 by the clamping circuit. This potential corresponds to the pedestal level or blanking pulse indicated at 31 in Fig. 2. Since anode 38 of diode 34 and cathode 35 of diode 33 are now floating, control grid 3 of mixer tube 1 is free to deviate in a positive direction from its clamping level 31 and can follow the video signal 29 impressed thereon.

The output signal developed across cathode resistor 7 has been illustrated in Fig. 2 at 47 and includes video output signal 46 and synchronizing output signal 48. It will be obvious that the tips of the synchronizing output pulses 48 correspond to ground potential, because during this time mixer tube 1 is inoperative so that no potential is developed across cathode resistor 7. After the occurrence of the trailing edge of the synchronizing pulse, control grid 3 is still clamped at a predetermined level which determines the amplitude of the blanking output pulses 45 and thus determines the amplitude of the synchronizing output pulses 48 with respect to that of video output signal 46.

The composite picture or video output signal 47 developed across cathode resistor 7 is now impressed upon amplifier and modulator 50 to which is coupled oscillator 51. The composite picture signal 47 must first be reversed in polarity before it is utilized to modulate the amplitude of the carrier wave as required by the present television standards. Thereafter the amplitude of the carrier wave developed by oscillator 51 is modulated in accordance with the composite picture signal and the modulated carrier wave may be radiated into space by antenna 52 connected to modulator 50.

As pointed out hereinabove, the level of the blanking output pulses 45 is determined by the position of variable tap 42, that is, by the negative potential impressed upon anode 36 of diode 33. Accordingly, the level of blanking output pulses 45 may be adjusted by adjusting tap 42. Alternatively, it is feasible to determine the relationship between the negative potential impressed through tap 42 on anode 36 of diode 33 and the voltage developed across cathode resistor 7. To this end video and blanking source 10 and synchronizing signal source 14 should be disconnected and switch 55 should be connected to terminal 56 so that cathode 37 of diode 34 is now connected to tap 42 as is anode 36 of diode 33. In that case the voltage divider including resistor 27, diode 28 and resistor 25 will maintain screen grid 4 of mixer tube 1 at an operating potential. The potential impressed upon control grid 3 is determined by the potential of variable tap 42. If control grid 3 has a potential that is positive with respect to that of tap 42, diode 34 will conduct while diode 33 becomes conducting if the potential of control grid 3 is negative with respect to that of tap 42. By measuring and varying the potential between tap 42 and ground and comparing it to the potential developed across cathode resistor 7, a curve showing the relationship between the two potentials may be plotted so that the amplitude of blanking output pulses 45 may be adjusted by measuring and adjusting the voltage between tap 42 and ground.

The signal mixer circuit of the present invention accordingly performs the following functions. It will mix the video and blanking signal with the composite synchronizing signal to develop the composite picture signal. Furthermore, the amplitude of the synchronizing output signal or of the blanking output signal may be adjusted and maintained at the desired value with respect to the amplitude of the video output signal. Finally, the clamping circuit periodically brings control grid 3 to a predetermined potential and thus functions to reinsert the direct current and low frequency video components which may have been lost in the previous video amplifier stages. The pedestal level or the amplitude of blanking output pulses 45 may be kept within the tolerances recommended by the Radio Manufacturers' Association.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A composite picture signal mixer circuit comprising, a signal mixer tube having a cathode, a control grid, a screen grid and an anode, a source of positive voltage, an impedance element, means for connecting said source of positive voltage and said impedance element in series across said anode and said cathode, means for impressing synchronizing pulses on said screen grid in a negative polarity, means for impressing a video signal on said control grid, a voltage divider including a diode connected across said source of positive voltage, means for connecting an intermediate point of said voltage divider to said screen grid for normally maintaining said screen grid at a predetermined operating potential and for cutting off said diode upon the arrival of each of said synchronizing pulses to render said tube non-conductive, a normally inoperative clamping circuit connected to said control grid, and means for impressing said synchronizing pulses on said clamping circuit to render it conductive and to impress a predetermined negative voltage on said control grid upon the arrival of each of said synchronizing pulses, thereby to derive a composite picture output signal including said synchronizing pulses and said video signals across said impedance element and to determine the amplitude of said synchronizing output pulses by said negative voltage.

2. A composite picture signal mixer circuit comprising, a signal mixer tube having a cathode, a control grid, a screen grid and an anode, a source of positive voltage, an impedance element connected to said cathode, means for connecting said source of positive voltage across said anode and said impedance element, means for impressing synchronizing pulses on said screen grid in a negative polarity, means for impressing a video signal on said control grid, a first voltage divider connected across said source of positive voltage, a second voltage divider including a diode and connected between said source of positive voltage and an intermediate point of said first voltage divider, means for connecting an intermediate point of said second voltage divider to said screen grid for normally maintaining said screen grid at a predetermined operative potentiol and for cutting off said diode upon the arrival of each of said synchronizing pulses to render said tube inoperative, a normally non-conductive clamping circuit connected to said control grid, and means for impressing said synchronizing pulses on said clamping circuit to render it conductive and to impress a predetermined negative voltage on said control grid upon the arrival of each of said synchronizing pulses, thereby to derive a composite picture output signal including said synchronizing pulses and said video signal across said impedance element and to determine the amplitude of said synchronizing output pulses by said negative voltage.

3. A composite picture signal mixer circuit comprising, a signal mixer tube having a cathode, a control grid, a screen grid and an anode, a souce of positive voltage, a resistor connected to said cathode, means for connecting said source of positive voltage across said anode and the free terminal of said resistor, means for impressing synchronizing pulses on said screen grid in a negative polarity, means for impressing a video signal on said control grid, a voltage divider including a first diode connected across said source of positive voltage, means for connecting an intermediate point of said voltage divider to said screen grid for normally maintaining said screen grid at a predetermined operative potential and for cutting off said first diode upon the arrival of each of said synchronizing pulses to render said tube inoperative, a normally non-conductive clamping circuit comprising a second and third diode, each having a cathode and an anode, a source of negative voltage, adjustable means for connecting said source of negative voltage to the anode of said second diode, the cathode of said second diode and the anode of said third diode being connected to said control grid, and means for impressing said synchronizing pulses on the cathode of said third diode, thereby to render said second and third diode conductive upon the arrival of each of said synchronizing pulses to impress a predetermined voltage on said control grid and to derive a composite picture output signal including said synchronizing pulses and said video signal across said resistor, the amplitude of said synchronizing output pulses being determined by said negative voltage.

4. A composite picture signal mixer circuit comprising, a signal mixer tube having a cathode, a control grid, a screen grid and an anode, a source of positive voltage, a resistor connected to said cathode, means for connecting said source of positive voltage across said anode and the free terminal of said resistor, means including a condenser for impressing synchronizing pulses on said screen grid in a negative polarity, means including a further condenser for impressing a video signal on said said control grid, a first voltage divider connected across said source of positive voltage, a second voltage divider including a first diode and connected between said source of positive voltage and an intermediate point of said first voltage divider, means for connecting an intermediate point of said second voltage divider to said screen grid for normally maintaining said screen grid at a predetermined operative potential and for cutting off said first diode upon the arrival of each of said synchronizing pulses to render said tube inoperative, a normally inoperative clamping circuit comprising a second and third diode, each having a cathode and an anode, a source of negative voltage, adjustable means for connecting said source of negative voltage to the anode of said second diode, the cathode of said second diode and the anode of said third diode being connected to said control grid, and means for impressing said synchronizing pulses on the cathode of said third diode, thereby to render said second and third diode conductive upon the arrival of each of said synchronizing pulses to impress a predetermined voltage on said control grid and to derive a composite picture output signal including said synchronizing pulses and said video signal across said resistor, the amplitude of said synchronizing output pulses being determined by said negative voltage.

LOUIS F. MAYLE.

REFERENCES CITED

The following references are of record in the file of this patent:

UNITED STATES PATENTS

| Number | Name | Date |
|---|---|---|
| 2,171,536 | Bingley | Sept. 5, 1939 |
| 2,212,199 | Browne | Aug. 20, 1940 |
| 2,244,240 | Blumlein | June 3, 1941 |
| 2,307,375 | Blumlein et al. | Jan. 5, 1943 |
| 2,353,876 | Cawein | July 18, 1944 |
| 2,366,358 | Schlesinger | Jan. 2, 1945 |
| 2,402,091 | Schade | June 11, 1946 |
| 2,445,040 | Schade | July 13, 1948 |

FOREIGN PATENTS

| Number | Country | Date |
|---|---|---|
| 100,569 | Australia | Apr. 8, 1937 |